(12) United States Patent
Nagai et al.

(10) Patent No.: US 10,478,828 B2
(45) Date of Patent: Nov. 19, 2019

(54) SOLVENT SEPARATION METHOD AND SOLVENT SEPARATION APPARATUS

(71) Applicant: Panasonic Corporation, Osaka (JP)

(72) Inventors: Koichi Nagai, Kyoto (JP); Masanori Minamio, Osaka (JP); Toshiro Kanda, Kyoto (JP); Masahiro Kawata, Osaka (JP); Yasuyuki Takano, Osaka (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 15/464,956

(22) Filed: Mar. 21, 2017

(65) Prior Publication Data

US 2017/0341085 A1     Nov. 30, 2017

(30) Foreign Application Priority Data

May 30, 2016  (JP) .................................. 2016-107586

(51) Int. Cl.
| | |
|---|---|
| *B03C 3/01* | (2006.01) |
| *B03C 3/38* | (2006.01) |
| *B03C 3/02* | (2006.01) |
| *B03C 3/017* | (2006.01) |
| *B01D 53/32* | (2006.01) |

(Continued)

(52) U.S. Cl.
CPC .............. *B03C 3/01* (2013.01); *B01D 53/002* (2013.01); *B01D 53/323* (2013.01); *B03C 3/017* (2013.01); *B03C 3/02* (2013.01); *B03C 3/38* (2013.01); *F28B 1/06* (2013.01)

(58) Field of Classification Search
CPC combination set(s) only.
See application file for complete search history.

(56) References Cited

U.S. PATENT DOCUMENTS 3,686,893 A * 8/1972 Edwards .................. B60H 1/32
                                                                    62/402
3,968,649 A * 7/1976 Edwards .................. F01N 3/02
                                                                    60/297

(Continued)

FOREIGN PATENT DOCUMENTS

| JP | 62228895 A | * | 10/1987 | .............. F28F 13/16 |
| JP | 63073095 A | * | 4/1988 | .............. F28F 13/16 |

(Continued)

*Primary Examiner* — Amber R Orlando
*Assistant Examiner* — Sonji Turner
(74) *Attorney, Agent, or Firm* — Panasonic IP Management; Kerry S. Culpepper (57) ABSTRACT

Provided is a solvent separation method and a solvent separation apparatus that make it possible to efficiently retrieve the thermal energy possessed by an exhaust atmosphere released in a solvent-removal step to suppress reductions in a temperature of the exhaust atmosphere. In the solvent separation method and the solvent separation apparatus, a vaporized solvent is removed from a gas while heat exchange between the gas within a condensation part and the gas within a dust-collection part is conducted by using a heat exchange part that is placed between the condensation part that introduces the gas into a first direction and the dust-collection part that introduce the gas into a second direction opposite to the first direction the gas discharged from a downstream side of the condensation part.

8 Claims, 8 Drawing Sheets

(51) Int. Cl.
*F28B 1/06* (2006.01)
*B01D 53/00* (2006.01)

(56) References Cited

U.S. PATENT DOCUMENTS

| | | | | |
|---|---|---|---|---|
| 4,097,252 A | * | 6/1978 | Kirchhoff | B03C 3/36 |
| | | | | 110/119 |
| 4,651,806 A | * | 3/1987 | Allen | F28F 13/16 |
| | | | | 165/110 |
| 6,815,814 B2 | * | 11/2004 | Chu | H01L 35/30 |
| | | | | 257/706 |
| 7,260,958 B2 | * | 8/2007 | Huang | F25B 39/04 |
| | | | | 165/104.23 |
| 8,596,068 B2 | * | 12/2013 | Staffend | F01C 13/04 |
| | | | | 60/620 |
| 2004/0200605 A1 | | 10/2004 | Yoshida et al. | |
| 2013/0153199 A1 | * | 6/2013 | Busch | F28F 27/00 |
| | | | | 165/287 |
| 2015/0122123 A1 | | 5/2015 | Segawa et al. | |
| 2016/0222831 A1 | | 8/2016 | Tanaka et al. | |

FOREIGN PATENT DOCUMENTS

| | | | | |
|---|---|---|---|---|
| JP | 63073096 A | * | 4/1988 | ............ F28F 13/16 |
| JP | 01046590 A | * | 2/1989 | ............ F28F 13/16 |
| JP | 4-063970 U | | 6/1992 | |
| JP | 2001-162267 A | | 6/2001 | |
| JP | 2004-301373 | | 10/2004 | |
| JP | 2015-202135 | | 11/2015 | |
| JP | 5855291 B | | 2/2016 | |
| KR | 10-2015-0052787 A | | 5/2015 | |

* cited by examiner

PRIOR ART

FIG. 8

PRIOR ART

SOLVENT SEPARATION METHOD AND SOLVENT SEPARATION APPARATUS

TECHNICAL FIELD

The technical field relates to a method and an apparatus for removing, from a gas including a vaporized solvent, the solvent.

BACKGROUND

In recent years, in processes for assembling and producing various industrial products such as home electronics, and processes for producing devices such as electronic components, batteries and substrates, paste materials that have various functions are coated onto the products or devices, and then, the products or devices are subjected to heat treatments by use of heat treatment apparatuses. For example, the heat treatment apparatuses include drying furnaces, baking furnaces, cure furnaces, and reflow furnaces. Reflow furnaces are used for soldering, for example, in an electronic component-mounting process. Various solvents such as water and organic solvents are mixed into the paste materials in addition to solid contents required in final products, to adjust their viscosities or performance.

Solvents included in paste materials are released therefrom to the inside of heat treatment apparatuses through the vaporization and solvent-removing process in the heating step in the heat treatment apparatuses. If the concentrations of the vaporized solvents inside the heat treatment apparatuses are increased, this possibly causes various problems. For example, if the concentrations of the solvents in the atmospheres inside the heat treatment apparatuses come close to saturation, it may be difficult to dry objects that are subjected to the heat treatments. Therefore, the outside air, or an atmosphere gas such as a nitrogen gas is regularly or continuously supplied into the heat treatment apparatuses, and, simultaneously, the atmospheres that include increased concentrations of the solvents present inside the heat treatment apparatuses are released to the outside.

Figure 7:
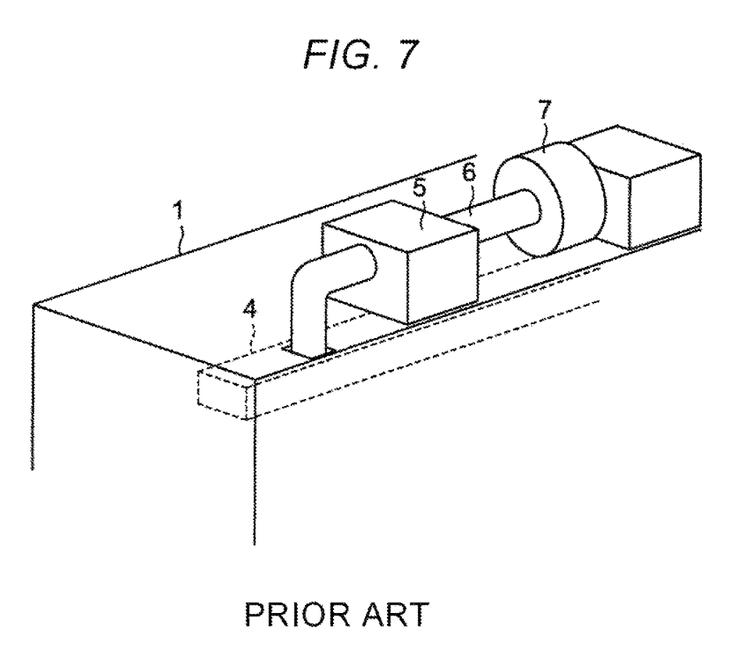
FIG. 7 is a diagram that depicts a conventional exhaust-purifying apparatus.

The solvents included in the released atmospheres can be removed based on, for example, a method disclosed in JP-A-2004-301373, after the atmospheres are discharged from the heat treatment apparatuses. FIG. 7 is a diagram that depicts the system disclosed in JP-A-2004-301373. As shown in FIG. 7, in the disclosed system, a cooler 5, an exhaust duct 6 present outside the heat treatment apparatus 1, and a mist collector 7 are connected in this order to an exhaust duct 4 inside the heat treatment apparatus 1. The cooler 5 cools the exhaust atmosphere discharged from the heat treatment apparatus 1 to thus devolatilize the vaporized solvent included in the exhaust atmosphere. The exhaust atmosphere including the devolatilized solvent is delivered into the mist collector 7 through the exhaust duct 6, and the volatilized solvent is captured and removed in the mist collector 7. Accordingly, the solvent can be removed from the exhaust atmosphere.

Figure 8:
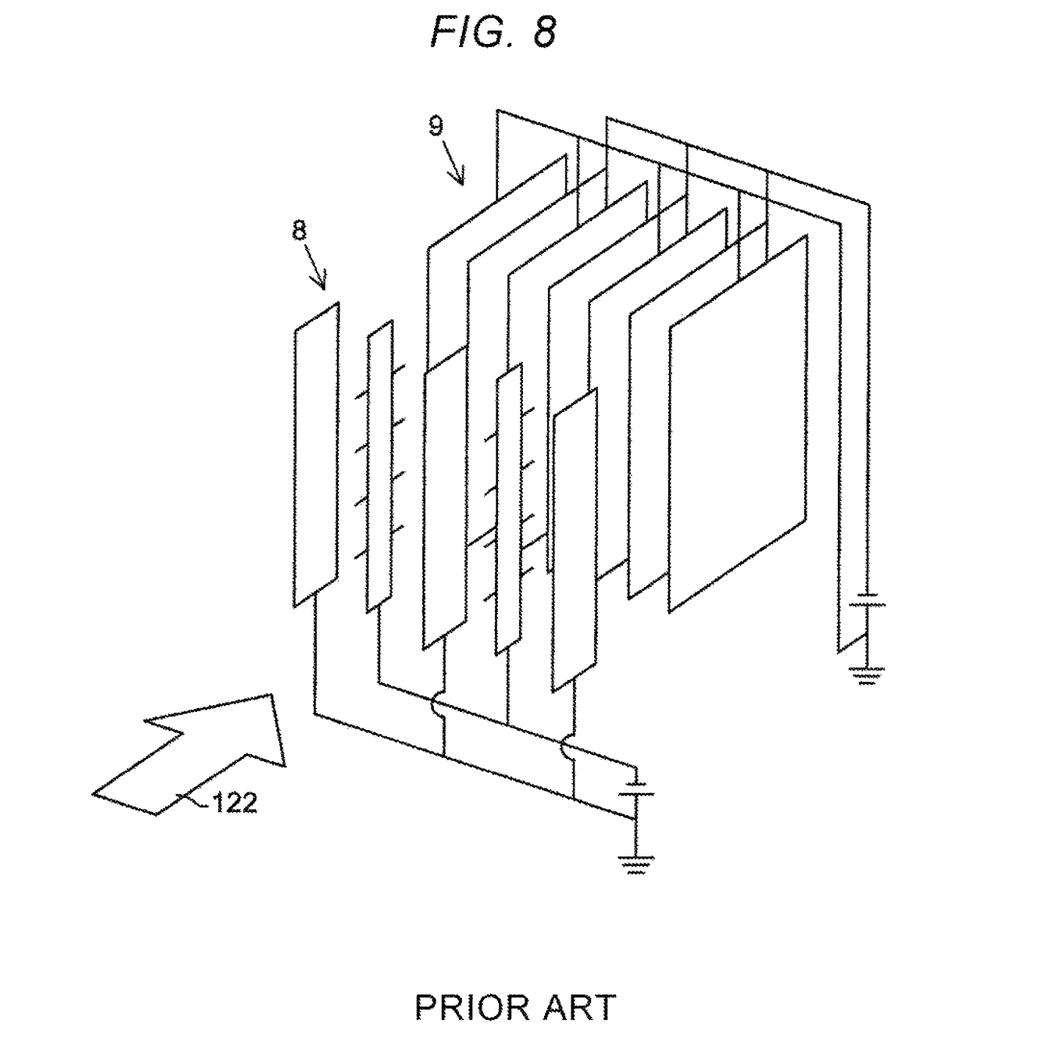
FIG. 8 is a diagram that depicts another conventional exhaust-purifying apparatus.

FIG. 8 shows another system for removing a vaporized solvent from an exhaust atmosphere. In the system in FIG. 8, discharging electrodes 8 are placed upstream of a direction in which an exhaust atmosphere 122 flows, and dust-collecting electrodes 9 are placed downstream thereof. The exhaust atmosphere 122 passes between the discharging electrodes 8, and between the dust-collecting electrodes 9, in a linear fashion. The discharging electrodes 8 apply electric fields to the exhaust atmosphere 122, and thus, causes the vaporized solvent to charge. The dust-collecting electrodes 9 further apply electric fields to the charged solvent. The solvent to which the electric field has been applied by the dust-collecting electrodes 9 adheres onto the dust-collecting electrodes 9 due to electrostatic attraction. Accordingly, it becomes possible to remove the solvent from the exhaust atmosphere 122.

SUMMARY

However, according to the system shown in FIG. 8, the thermal energy possessed by the exhaust atmosphere will increasingly be released as the exhaust atmosphere moves from the upstream to the downstream. Therefore, if the exhaust atmosphere that has been subjected to the solvent-removal treatment is returned to the heat treatment apparatus, and is recycled therein, it will be required that thermal energy is again added to the exhaust atmosphere that has a decreased temperature because of the release of the thermal energy.

It is considered that, by additionally providing a heat exchanger in the system in FIG. 8, the thermal energy possessed by the exhaust atmosphere is utilized for again adding a thermal energy to the atmosphere with a decreased temperature. However, in the system in FIG. 8, a high-temperature region (upstream side) and a low-temperature area (downstream side) are far apart from each other. Therefore, to provide a heat exchanger that provides heat exchange between the upstream and downstream sides, there will be problems that the heat exchanger will be large, and that heat exchange cannot efficiently be conducted because the upstream and downstream sides are far apart from each other.

In consideration of the above-mentioned problems, a purpose of the disclosure is to provide a solvent separation method and a solvent separation apparatus that make it possible to efficiently retrieve thermal energy possessed by the exhaust atmosphere that is released in a solvent-removal step, thereby suppressing reductions in the temperature of the exhaust atmosphere.

According to one aspect of the disclosure, provided is a solvent separation method, including: (i) introducing a gas including a vaporized solvent into a condensation part in a first direction; (ii) introducing the gas discharged from a downstream of the condensation part into a dust-collection part in a second direction opposite to the first direction; and (iii) removing the solvent from the gas through Steps (i) and (ii) while conducting heat exchange between the gas within condensation part and the gas within the dust-collection part by using a heat-exchange part that is placed between the condensation part and the dust-collection part.

In some embodiments, in the condensation part, an electric field is applied to the gas by using an electrode that simultaneously serves as the heat-exchange part, to condense the vaporized solvent.

In some embodiments, in the dust-collection part, an electric field is applied to the gas by using an electrode that simultaneously serves as the heat-exchange part, to separate the vaporized solvent.

According to another aspect of the disclosure, provided is a solvent separation apparatus, including: a condensation part that a gas including a vaporized solvent is introduced into in a first direction, and in which an electric field is applied to the gas to condense the vaporized solvent, and the gas is discharged therefrom to a downstream side of the condensation part; a dust-collection part that the gas discharged from the downstream side of the condensation part is introduced into in a second direction opposite to the first direction, and in which an electric field is applied to the gas to separate the vaporized solvent; and a heat-exchange part that is placed between the condensation part and the dust-collection part, and that provides heat exchange between the gas within the condensation part and the gas within the dust-collection part.

In some embodiments, the condensation part has a condensation region that serves as a space into which the gas is introduced, the dust-collection part has a dust-collection region that serves as a space into which the gas discharged from the condensation part is introduced, the condensation region and the dust-collection region are adjacent to each other, and the heat-exchange part is located between the condensation region and the dust-collection region.

In some embodiments, the condensation part and the dust-collection part are included in an electric-field unit, and the electric-field unit further includes a casing that configures the condensation region and the dust-collection region, and the heat-exchange part that separates the condensation region and the dust-collection region.

In some embodiments, the condensation part has a first electrode surface that is exposed to the condensation region and from which the electric field is applied to the gas within the condensation region, the dust-collection part has a second electrode surface that is exposed to the dust-collection region and from which the electric field is applied to the gas within the dust-collection region, and the heat-exchange part includes an electrode having the first electrode surface and the second electrode surface.

In some embodiments, the electrode has a first surface and a second surface that is a surface opposite to the first surface, the first surface configures the first electrode surface, and the second surface configures the second electrode surface.

In some embodiments, a discharging electrode, and a plurality of first projections that serve as a heatsink are provided on the first electrode surface, and a discharging electrode, and a plurality of second projections that serve as a heatsink are provided on the second electrode surface.

In some embodiments, the solvent separation apparatus further includes a blower that sucks the gas from the condensation part, that changes a direction of flow of the gas, and that delivers the gas to the dust-collection part.

In some embodiments, the blower has a collection surface that cools the vaporized solvent to devolatilize the same, thereby separating the same from the gas.

In the solvent separation method and solvent separation apparatus according to the disclosure, it becomes possible to efficiently retrieve thermal energy possessed by the exhaust atmosphere that is released in the solvent-removal step, and thus, it becomes possible to suppress reductions in the temperature of the exhaust atmosphere.

DESCRIPTION OF EMBODIMENTS

Hereinafter, embodiments of the disclosure will be described with reference to the drawings.

Figure 1:
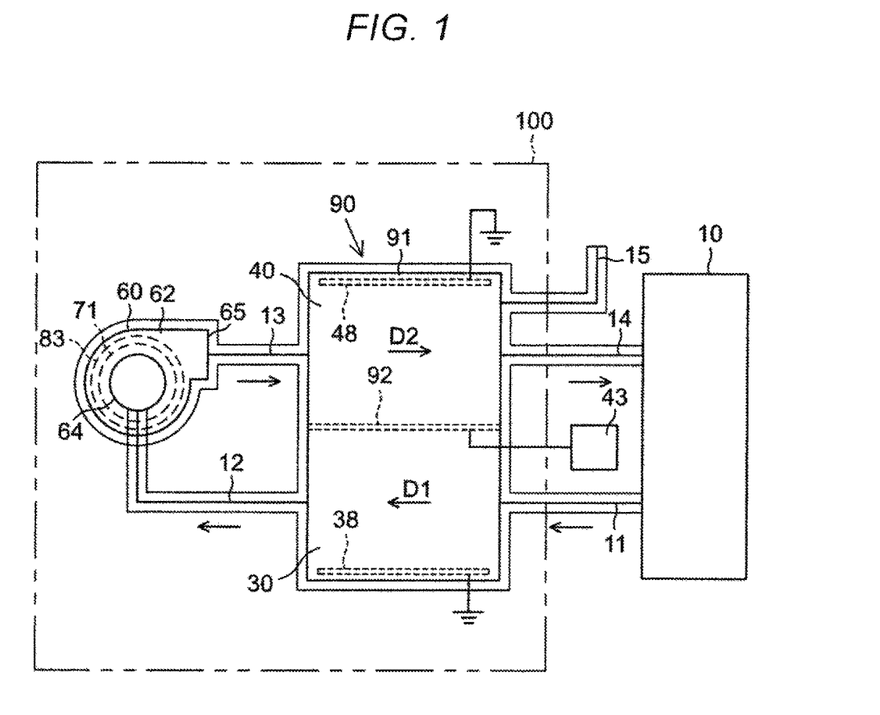
FIG. 1 is a diagram that shows a structure of a solvent separation apparatus according to a first embodiment of the disclosure.

FIG. 1 is a diagram that shows a structure of a solvent separation apparatus 100 according to a first embodiment of the disclosure. The overall structure of the solvent separation apparatus 100 will now be described with reference to FIG. 1. The solvent separation apparatus 100 is connected to a heat treatment apparatus 10 which is one example of an exhaust gas-generating apparatus. The solvent separation apparatus 100 includes: a condensation part 30; a dust-collection part 40; and a blower 60. In this embodiment, the condensation part 30 and the dust-collection part 40 are configured as a single unit that defines an electric-field unit 90.

The heat treatment apparatus 10 is a furnace (e.g., a sintering furnace, dry furnace, cure furnace and reflow furnace) that carries out a heat treatment. Various types of materials or elements that are objects to be heated are heated in the heat treatment. A solvent is vaporized into the atmosphere (gas) inside the heat treatment apparatus 10 through the heat treatment. A part of the atmosphere including the vaporized solvent is led to a first exhaust duct 11 that is placed to communicate with the heat treatment apparatus 10.

The first exhaust duct 11 communicates with the condensation part 30 of the electric-field unit 90. The exhaust atmosphere is introduced into the condensation part 30 in the first direction D1 through the first exhaust duct 11. Electrodes 92 and 38 are placed inside the condensation part 30. The electrode 92 is formed of a material having high heat conductivity. The electrode 92 is connected to a voltage-applying apparatus 43, and the electrode 38 is grounded. The electrodes 92 and 38 are applied with voltages by a voltage-applying apparatus 43, and thus, generate electric fields inside the condensation part 30. When the electric fields are applied to the exhaust atmosphere, molecules of the vaporized solvent are caused to charge, and come to a state in which they are present eccentrically around the side of the electrode 38 due to electrostatic attraction. Consequently, a bias will be caused in the concentration of the solvent in the exhaust atmosphere. Furthermore, molecules of the solvent attract one another due to the Coulomb's force, and gradually condense. The exhaust atmosphere including molecules of the condensed solvent is led to a second exhaust duct 12 that is placed so as to communicate with the condensation part 30.

Additionally, as described below in detail, the electrode 92 is shared by the condensation part 30 and the dust-collection part 40. Moreover, the electrode 92 also serves as a partition that separates the condensation part 30 and the dust-collection part 40 inside the electric-field unit 90. Furthermore, the electrode 92 serves as a heat-exchange part that provides heat exchange between the exhaust atmosphere within the condensation part 30 and the exhaust atmosphere within the dust-collection part 40.

The blower 60 communicates with the downstream side of the second exhaust duct 12. The second exhaust duct 12 is connected to an inlet 64 of the blower 60. An impeller 71 is provided inside a casing 62 of the blower 60. When the impeller 71 is rotated, the exhaust atmosphere is introduced into the casing 62 through the inlet 64. The exhaust atmosphere that has been introduced into the casing 62 is delivered to a third exhaust duct 13 through an outlet 65. That is, the blower 60 sucks the exhaust atmosphere that has been discharged from the electric-field unit 90 (condensation part 30), changes the direction of flow of the exhaust atmosphere, and again delivers the exhaust atmosphere to the electric-field unit 90 (dust-collection part 40).

A collection surface 83 is located inside the casing 62. As described below in detail, the collection surface 83 is maintained at a temperature lower than the temperature of the exhaust atmosphere that is delivered into the casing 62. When the collection surface 83 is maintained at such a low temperature, the temperature of the exhaust atmosphere that comes into contact with the collection surface 83 is decreased, and, as a result, a part of the solvent is devolatilized. In this case, the solvent has been condensed in the condensation part 30, which is located upstream, and therefore, the solvent is in a state in which it is likely to devolatilize. A part of the devolatilized solvent adheres to the collection surface 83, and is thus removed from the exhaust atmosphere.

The third exhaust duct 13 communicates with the dust-collection part 40 of the electric-field unit 90. The exhaust atmosphere is introduced into the dust-collection part 40 in the second direction D2 opposite to the first direction D1, from the blower 60 through the third exhaust duct 13. Electrodes 92 and 48 are placed inside the dust-collection part 40. As described above, the electrode 92 is shared also by the condensation part 30, and the electrode 48 is grounded. The electrode 92 is applied with a voltage by a voltage-applying apparatus 43 to generate an electric field inside the dust-collection part 40. Molecules of the vaporized solvent remaining in the exhaust atmosphere come to a state in which they are present eccentrically around the side of the electrode 48 due to electrostatic attraction when the electric field is applied to the exhaust atmosphere, and thus, the exhaust atmosphere is separated into a portion including the solvent, and a portion not including the solvent.

A circulation duct 14 and a discharge duct 15 are placed so as to communicate with the dust-collection part 40. The portion of the exhaust atmosphere that does not include the solvent is led to the circulation duct 14, and is returned to the heat treatment apparatus 10. On the other hand, the portion of the exhaust atmosphere that includes the solvent is led to the discharge duct 15, is discharged from the dust-collection part 40, and is collected. In that case, heat exchange is carried out between the exhaust atmosphere within the dust-collection part 40 and the exhaust atmosphere within the condensation part 30 through the electrode 92. The dust-collection part 40 is located downstream of the condensation part 30, and the thermal energy possessed by the exhaust atmosphere within the dust-collection part 40 is lower than the thermal energy possessed by the exhaust atmosphere within the condensation part 30. In this manner, such heat exchange is carried out through the electrode 92, and thus, the exhaust atmosphere that is led to the circulation duct 14 will be returned to the heat treatment apparatus 10 in a state of having retrieved the thermal energy from the exhaust atmosphere present inside the condensation part 30.

As described above, the exhaust atmosphere that has been discharged from the heat treatment apparatus 10 is led to the condensation part 30, the blower 60 and the dust-collection part 40 in this order, and then, is returned to the heat treatment apparatus 10. In other words, the exhaust atmosphere that has been discharged from the heat treatment apparatus 10 is subjected to a condensation treatment in the condensation part 30 of the electric-field unit 90, and then, is sucked by the blower 60, and the direction of flow of the exhaust atmosphere is changed by the blower 60. Subsequently, the exhaust atmosphere is delivered to the dust-collection part 40 of the electric-field unit 90, is subjected to a dust-collection treatment therein, and then, is returned to the heat treatment apparatus 10. With regards to the inside of the electric-field unit 90, the temperature of the exhaust atmosphere inside the condensation part 30 is relatively higher since it is an exhaust atmosphere immediately after its discharge from the heat treatment apparatus 10, while the temperature of the exhaust atmosphere inside the dust-collection part 40 is relatively lower since it is an exhaust atmosphere with the solvent removed and immediately before its return to the heat treatment apparatus 10. Inside the electric-field unit 90, there is a structure in which the relatively-high-temperature exhaust atmosphere within the condensation part 30 and the relatively-low-temperature exhaust atmosphere within the dust-collection part 40 are in contact with each other via the electrode 92 that is formed of a material having high heat conductivity. Accordingly, this structure realizes heat exchange between the condensation part 30 and the dust-collection part 40 through the electrode 92 that also serves as a heat-exchange part, and thus, makes it possible for the exhaust atmosphere to retrieve the thermal energy inside the electric-field unit 90 and to further return the exhaust atmosphere to the heat treatment apparatus 10. In addition, the electric-field unit 90, the blower 60, and ducts 11, 12, 13, 14 and 15 are thermally insulated from the outside with heat insulation materials, and thus, are configured to suppress release of the thermal energy to the outside, although this is not described in the figure.

Figure 2:
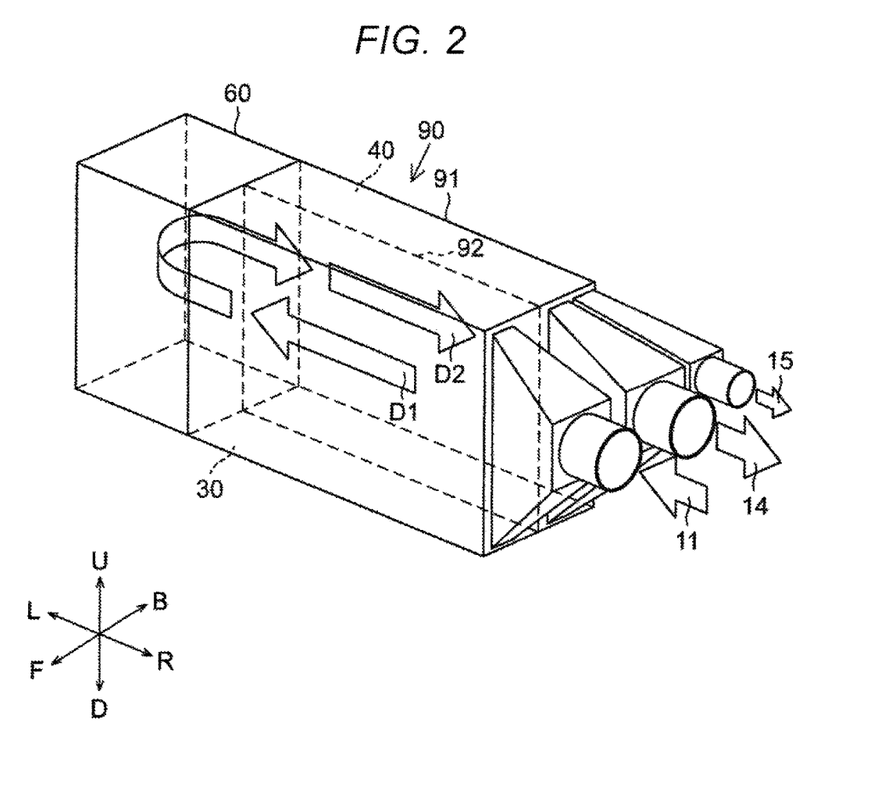
FIG. 2 is a perspective view that shows the layout of an electric-field unit and a blower.

FIG. 2 is a perspective view that shows the layout of the electric-field unit 90 and the blower 60. In FIGS. 2, 3, 5 and 6, arrow R refers to the right direction, arrow L refers to the left direction, arrow U refers to the upward direction, arrow D refers to the downward direction, arrow F refers to the forward direction, and arrow B refers to the backward direction.

As shown in FIG. 2, the electric-field unit 90 is provided with a casing 91. Inside the casing 91, the condensation part 30 and the dust-collection part 40 are placed so as to be adjacent to each other. The electrode 92 that separates the condensation part 30 and the dust-collection part 40 is further placed inside the casing 91. The exhaust atmosphere is introduced into the condensation part 30 in the first direction D1 from the heat treatment apparatus 10 through the first exhaust duct 11. The exhaust atmosphere that has been subjected to a condensation treatment in the condensation part 30 is sucked by the blower 60, and thus, is discharged from the condensation part 30. The blower 60 changes the direction of flow of the exhaust atmosphere, and delivers the exhaust atmosphere to the electric-field unit 90 (dust-collection unit 40).

The exhaust atmosphere discharged from the blower 60 is introduced into the dust-collection unit 40 in the second direction D2 opposite to the first direction D1, through the third exhaust duct 13 (not shown in the figure). With regards to the atmosphere that has been subjected to the dust-collection treatment in the dust-collection unit 40, the portion thereof not including the solvent is led to the circulation duct 14, and is returned to the heat treatment apparatus 10. On the other hand, the portion thereof including the solvent is led to the discharge duct 15, is discharged from the dust-collection part 40, and is collected.

Inside the electric-field unit 90, there is a structure in which the condensation part 30 and the dust-collection part 40 are adjacent to each other via the electrode 92. Accordingly, the structure realizes heat exchange between the exhaust atmosphere within the condensation part 30 and the exhaust atmosphere within the collection part 40 through the electrode 92 that simultaneously serves as a heat-exchange part, and thus, it becomes possible to retrieve the thermal energy inside the electric-field unit 90 and to further return the retrieved thermal energy to the heat treatment apparatus 10.

Figure 3:
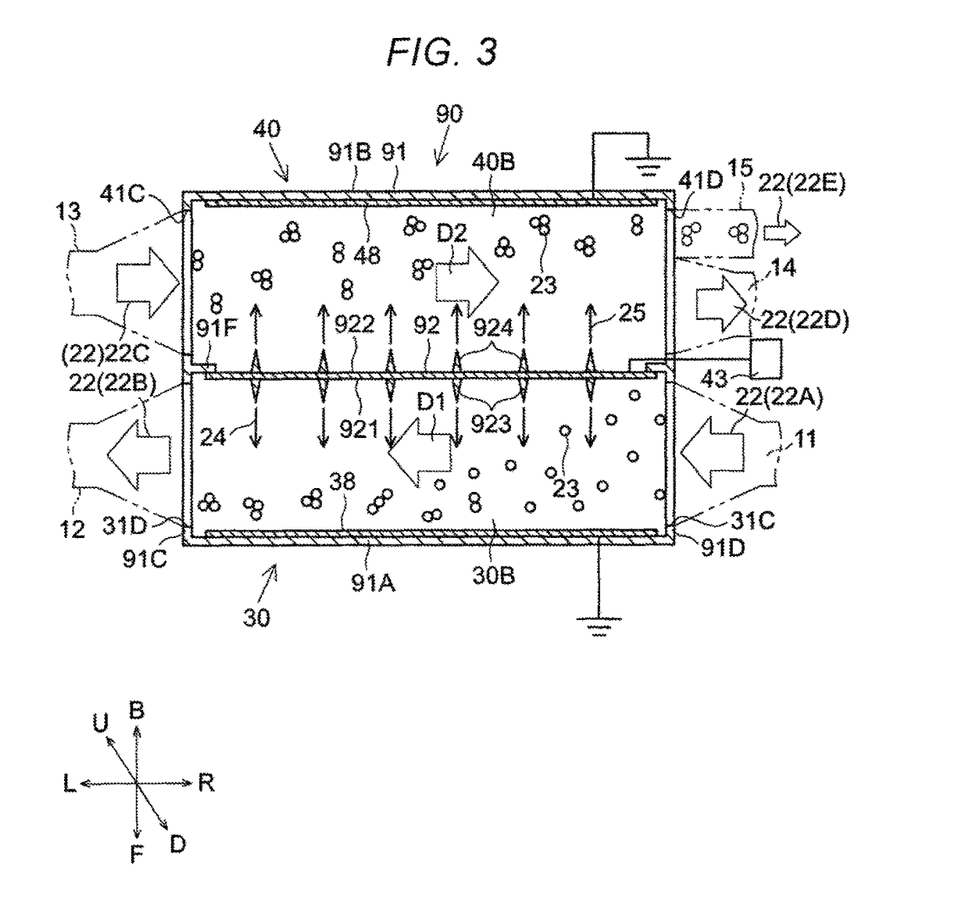
FIG. 3 is a planar cross-section diagram of an electric-field unit.

FIG. 3 is a planar cross-section diagram of the electric-field unit 90. The structure of the electric-field unit 90 will now be described in detail with reference to FIG. 3. As shown in FIG. 3, the electric-field unit 90 is provided with a casing 91. The condensation part 30 and the dust-collection part 40 are placed inside the casing 91 so as to be adjacent to each other. The casing 91 is formed into, for example, a box shape, and may have a front wall 91A, a rear wall 91B, a left wall 91C, a right wall 91D, a top wall (not shown in the figure), and a bottom wall (not shown in the figure). The front wall 91A and the rear wall 91B face each other in the front-back direction; the left wall 91C and the right wall 91D face each other in the horizontal direction; and the top wall and the bottom wall face each other in the vertical direction. The electrode 92 that separates an internal space within the casing 91 is placed inside the casing 91. The electrode 92 is supported by a support wall 91F. The internal space within the casing 91 is partitioned into a condensation region 30B and a dust-collection region 40B by the electrode 92. In other words, the condensation region 30B and the dust-collection region 40B are adjacent to each other via the electrode 92. The electrode 92 corresponds to one example of the electrode and the heat-exchange part in the disclosure.

The electrode 92 is formed of an electrically-conductive material having high heat conductivity. The electrode 92 may be formed of, for example, a single metal plate, and may have a first surface 921, and a second surface 922 that is a surface opposite to the first surface 921. The first surface 921 configures one example of a first electrode surface in the disclosure, and the second surface 922 configures one example of a second electrode surface in the disclosure. The first surface 921 faces the condensation region 30B, and the second surface 922 faces the dust-collection region 40B. A plurality of first projections 923 is provided on the first surface 921, and a plurality of second projections 924 is provided on the second surface 922. The second projections 924 on the second surface 922 are provided in locations corresponding to locations of the first projections 923 on the first surface 921.

The first projections 923 each has a function as an electrode discharging an electric current to the condensation region 30B, and a function as a heat sink that makes it easier to retrieve the thermal energy from the exhaust atmosphere within the condensation region 30B. Additionally, the second projections 924 each have a function as an electrode discharging an electric current to the dust-collection region 40B, and a function as a heat sink that makes it easier to supply the thermal energy retrieved from the exhaust atmosphere within the condensation region 30B into the exhaust atmosphere within the dust-collection region 40B. That is, the electrode 92 has a function as an electrode shared by the condensation part 30 and the dust-collection part 40, a function as a partition that separates the condensation part 30 and the dust-collection part 40 within the electric-field unit 90, and a function as a heat-exchange part that provides heat exchange between the exhaust atmosphere within the condensation part 30 and the exhaust atmosphere within the dust-collection part 40.

The condensation part 30 is provided with the first surface 921 of the electrode 92, the first surface 921 exposing to the inner space in the condensation region 30B, and an electrode 38. The electrode 38 is provided on the front wall 91A that faces the first surface 921 of the electrode 92. An inlet 31C is provided in the right wall 91D, and an outlet 31D is provided in the left wall 91C. The first exhaust duct 11 is connected to the inlet 31C, and the second exhaust duct 12 is connected to the outlet 31D. The exhaust atmosphere 22 is introduced into the condensation region 30B inside the casing 91 from the inlet 31C in the first direction D1 (the left direction shown in the figure) toward the outlet 31D. The first surface 921 of the electrode 92 and the electrode 38 are provided so as to extend to the first direction D1 in which the exhaust atmosphere 22 flows.

The dust-collection part 40 is provided with the second surface 922 of the electrode 92, the second surface 922 exposing to the inner space in the dust-collection region 40B, and an electrode 48. The electrode 48 is provided on the rear wall 91B that faces the second surface 922 of the electrode 92. An inlet 41C is provided in the left wall 91C, and an outlet 41D is provided in the right wall 91D. The third exhaust duct 13 is connected to the inlet 41C. A discharge duct 15 is connected to the outlet 41D along with the rear wall 91B, and a circulation duct 14 is also connected to the outlet 41D along the second surface 922 of the electrode 92. That is, the side of the dust-collection part 40 is configured so as to branch into the discharge duct 15 and the circulation duct 14. The exhaust atmosphere 22 is introduced into the dust-collection region 40B inside the casing 91 from the inlet 41C, and is caused to flow through the dust-collection region 40B toward the outlet 41D in the second direction D2 (the right direction shown in the figure) opposite to the first direction D1. The second surface 922 of the electrode 92 and the electrode 48 are provided so as to extend to the second direction D2 in which the exhaust atmosphere 22 flows.

A voltage is applied to the electrode 92 by the voltage-applying apparatus 43. An amount of the voltage applied thereto is determined, as appropriate, in consideration of the concentration of the solvent 23, the length of the electrode 92, the flow rate of the exhaust atmosphere 22, volumes of the condensation region 30B and the dust-collection region 40B, etc.

When the voltage is applied to the electrode 92, a potential difference is caused between the first wall surface 921 of the electrode 92 and the electrode 38, and an electric field 24 is caused inside the condensation part 30. Furthermore, a potential difference is also caused between the second wall surface 922 of the electrode 92 and the electrode 48, and an electric field 25 is caused inside the dust-collection part 40. The electric fields 24 and 25 are generated inside the condensation part 30 and the dust-collection part 40, respectively, in directions that intersect with directions, to each of which the exhaust atmosphere 22 flows.

Next, the condensation treatment in the condensation part 30 will be described. As shown in FIG. 3, when the electric field 24 is applied to the exhaust atmosphere 22 (22A) that has been introduced into the condensation part 30 from the first exhaust duct 11, molecules of the solvent 23 having polarity in their molecular structures come into a state in which they are present eccentrically around the side of the electrode 38 due to electrostatic attraction, and a bias in the concentration of the solvent in the exhaust atmosphere 22 will be caused. In this case, electrostatic attraction means that a positively-charged material is attracted by a negative electrical charge, and that a negatively-charged material is attracted by a positive electrical charge. Furthermore, a positively-polarized part of one molecule of the solvent 23, and a negatively-polarized part of another molecule of the solvent 23 attract one another due to the Coulomb's force. Accordingly, molecules of the solvent 23 gradually condense. The exhaust atmosphere 22 (22B) including condensed molecules of the solvent 23 is led to the second exhaust duct 12 that is located at the side of the casing 91 where the outlet 31D is present. In addition, the electrode 92 has a function to cause the exhaust atmosphere within the dust-collection region 40B to retrieve the thermal energy possessed by the exhaust atmosphere within the condensation region 30B. That is, the electrode 92 lowers the temperature of the exhaust atmosphere within the condensation region 30B. The lower the temperature is, the more progressively condensation of molecules of the solvent 23 proceeds in the condensation part 30. Therefore, the heat-exchange function of the electrode 92 also exerts an effect to facilitate the progress of the condensation treatment.

Figure 4:
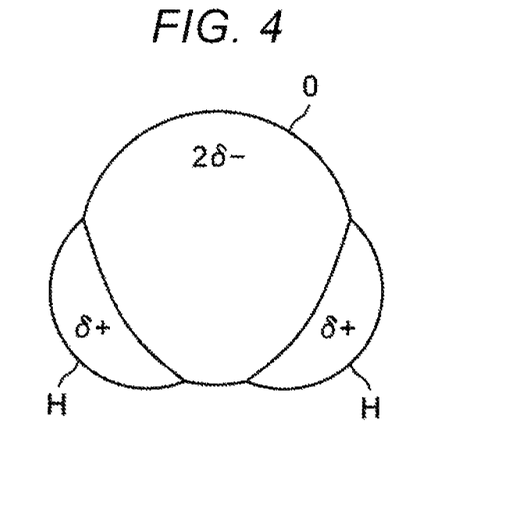
FIG. 4 is a diagram that shows a molecular structure of water.

Now, polarity of molecules of the solvent 23 will be described. FIG. 4 is a diagram that shows a molecular structure of water. As shown in FIG. 4, since water is polar in relation to its molecular structure, water has an electrical bias. Any other solvents such as ethanol have the same property. In general, materials used as solvents are polar in relation to their molecular structures, and therefore, have properties that make it possible to easily dissolve other materials. In other words, it is considered that most of materials used as solvents are polar. When molecules of such polar solvents are placed in an electric field, the molecules of solvents are attracted to the electrode due to electrostatic attraction even if the electrode that causes the electric field is either positive or negative. This is because, by electrostatic attraction, negatively-polarized parts of the molecules of solvents are drawn in cases where the electrode is positive, and positively-polarized parts of the molecules of solvents are drawn in cases where the electrode is negative. In addition, even in cases where there is no polarity in molecules of solvents, electrostatic polarization is caused, and they come into a state in which they acquire a polarity, when the molecules of solvents are placed in the electric field. Accordingly, even if molecules of solvents do not possess any polarity, they behave in the same manner as molecules of solvents having polarity, when an electric field is applied to them.

Next, the dust-collection treatment in the dust-collection part 40 will be described. As shown in FIG. 3, when the electric field 25 is applied to the exhaust atmosphere 22 (22C) that has been introduced into the dust-collection part 40 from the third exhaust duct 13, molecules of the solvent 23 having polarity in their molecular structures come into a state in which they are present eccentrically around the side of the electrode 48 due to electrostatic attraction, and a bias in the concentration of the solvent in the exhaust atmosphere 22 occurs. Then, the exhaust atmosphere 22 (22E) including the solvent 23 concentrated in the vicinity of the electrode 48 is led to the discharge duct 15, is discharged from the dust-collection part 40, and is then collected. On the other hand, the exhaust atmosphere 22 (22D) from which the solvent 23 has been removed is led to the circulation duct 14, is discharged from the dust-collection part 40, and then, is again introduced into the heat treatment apparatus 10.

Figure 5:
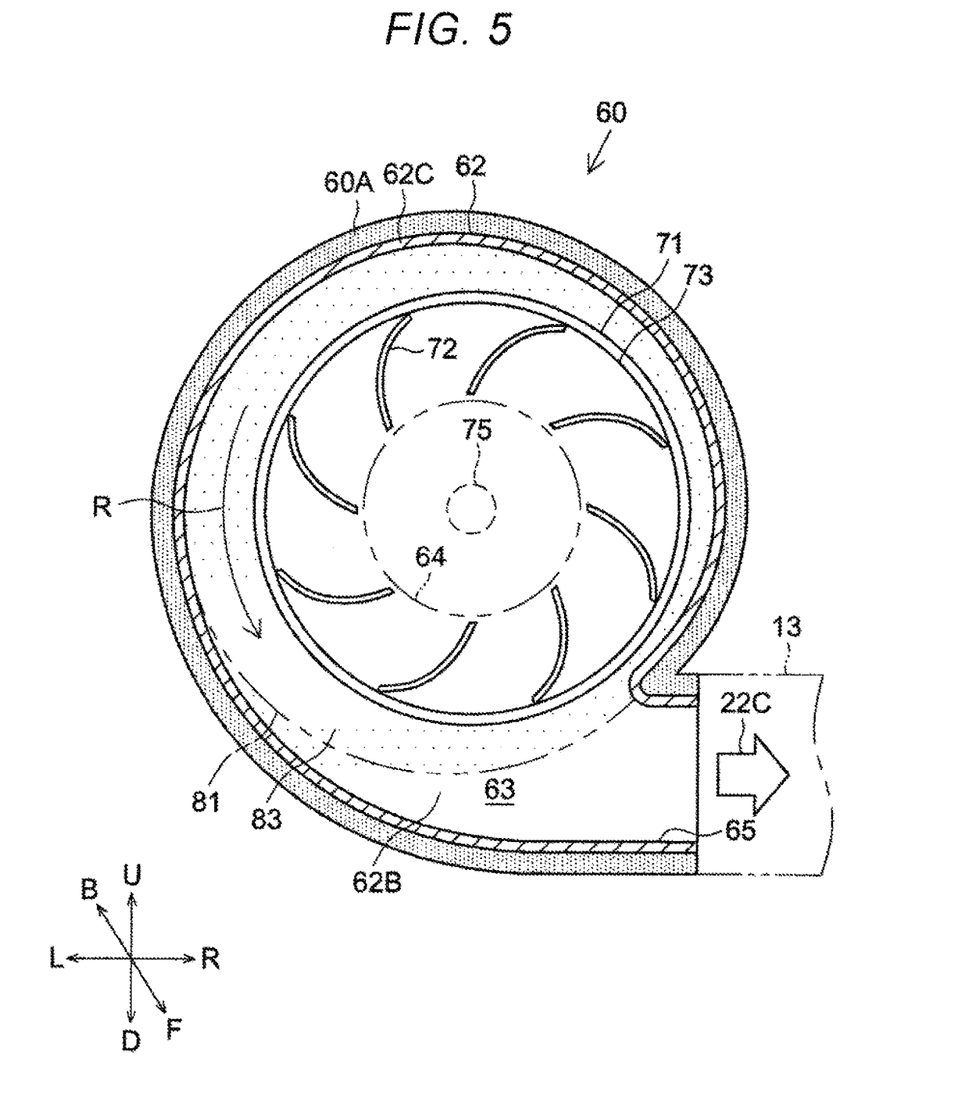
FIG. 5 is a front cross-section diagram of a blower.

Next, the blower 60 will be described. FIG. 5 is a front cross-section view of the blower 60. As shown in FIG. 5, the blower 60 includes a casing 62, and an impeller 71. The blower 60 in this embodiment is a sirocco fan, which is one of centrifugal fans. However, the blower 60 is not limited to a sirocco fan, and may be a turbo fan, which is also one of centrifugal funs, or may be an axial flow fan, which delivers a gas in the rotating axial direction.

The impeller 71 includes multiple blades 72, and a support plate 73. The multiple blades 72 are curved plate-like members, and are arrayed around a rotating shaft 75 at regular intervals. Rear end portions of the multiple blades 72 are supported by the support plate 73. The support plate 73 is a disk-shaped member, and its center part is connected with the rotating shaft 75. The rotating shaft 75 penetrates into the casing 62, and is connected with a motor (not shown in the figure). The impeller 71 is capable of rotating in the direction indicated by arrow R around the rotating shaft 75 by means of a driving force from the motor.

The casing 62 has a storage space 63, an inlet 64, and an outlet 65. The storage space 63 is a space for storing the impeller 71. The inlet 64 is an opening part for introducing the exhaust atmosphere 22 into the storage space 63. A second exhaust duct 12 is connected to the inlet 64. The exhaust atmosphere 22 (22B) is introduced into the storage space 63 from the second exhaust duct 12 through the inlet 64 in the axial direction of the rotating shaft 75, i.e., in a direction from the front side toward the rear side.

The outlet 65 is an opening part for discharging the exhaust atmosphere 22 (22C) from the storage space 63. The outlet 65 is located toward the direction that intersects with the rotating shaft 75, i.e., toward the right direction in FIG. 5. When the impeller 71 is rotated in the direction indicated by arrow R, the exhaust atmosphere 22 (22B) that has been introduced into the central part of the impeller 71 from the inlet 64 passes through respective spaces between blades 72 from the central part of the impeller 71 due to the centrifugal force, and is released toward the outward radial direction. Then, the exhaust atmosphere 22 (22C) circles to the direction indicated by arrow R along the side plate 62C of the casing 62, and is discharged from the outlet 65 due to the centrifugal force.

A heat insulation material 60A is placed on the outer surface of the casing 62. However, the heat insulation material 60A is not placed within regions of an outer surface of the back plate 62B, the regions corresponding to the collection part 81 and the collection surface 83. Accordingly, heat is released from the collection surface 83 through the back plate 62B of the casing 62. Even when a high-temperature exhaust atmosphere 22 is delivered into the casing 62, the surface of the collection surface 83 is cooled by the heat release, and is maintained at a temperature lower than that of the exhaust atmosphere 22.

When the collection surface 83 is maintained at such a low temperature, the temperature of the exhaust atmosphere 22 that comes into contact with the collection surface 83 is decreased. As a result, the saturated vapor pressure of the solvent 23 is decreased, and thus, a part of the solvent 23 is devolatilized. In this case, molecules of the solvent 23 have been condensed in the condensation part 30, which is located upstream, and therefore, the solvent 23 is in a state in which it is likely to devolatilize. The devolatilized solvent 23 adheres to the collection surface 83, and is thus removed from the exhaust atmosphere. Thus, a part of the solvent 23 included in the exhaust atmosphere 22 is removed therefrom, and the concentration of the solvent in the exhaust atmosphere 22 can be reduced.

According to the above-described first embodiment, heat exchange between the exhaust atmosphere within the condensation part 30 and the exhaust atmosphere within the dust-collection part 40 is conducted by use of the electrode 92. The first direction D1 in which the exhaust atmosphere is introduced into the condensation part 30 is opposite to the second direction D2 in which the exhaust atmosphere is introduced into the dust-collection part 40. Accordingly, it becomes possible to cause the high-temperature region (upstream side) and the low-temperature region (downstream side) to come close to each other. Thus, efficient heat exchange becomes possible between the exhaust atmosphere introduced into the condensation part 30 and the exhaust atmosphere discharged from the dust-collection part 40, the thermal energy possessed by the exhaust atmosphere released in the solvent-removal step can efficiently be retrieved, thereby suppressing reductions in the temperature of the exhaust atmosphere. Additionally, the heat exchange is carried out through the electrode 92, and therefore, the thermal energy can be retrieved without providing any additional heat exchangers.

VARIATION EXAMPLES

Figure 6:
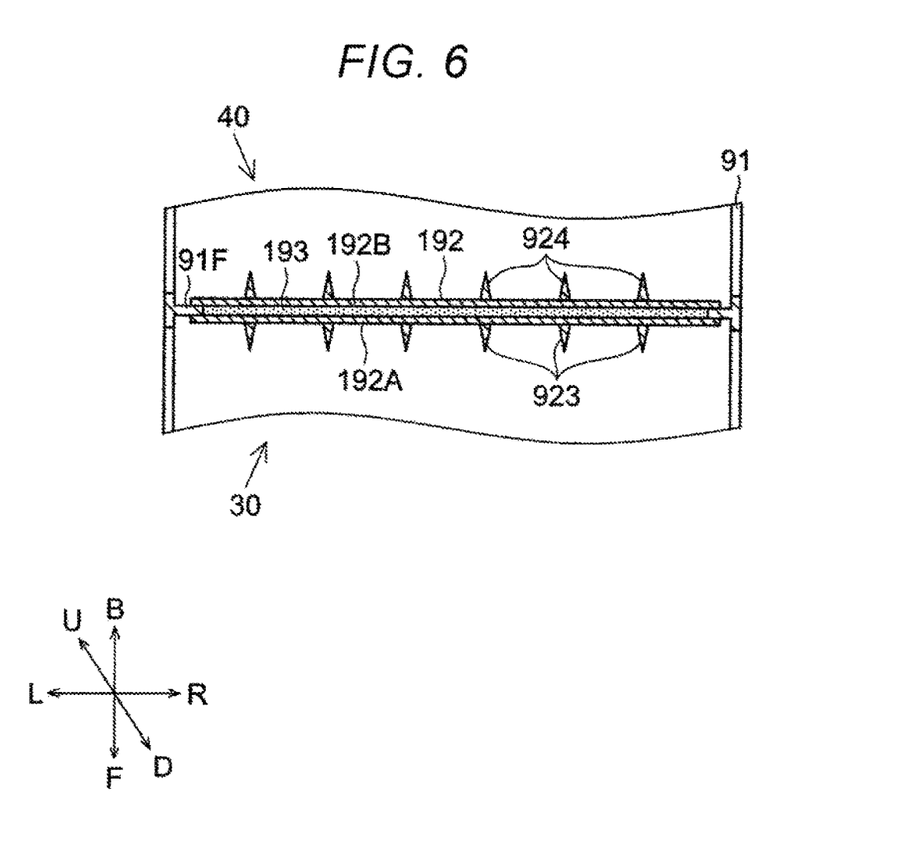
FIG. 6 is a diagram that shows a variation example of an electrode.

Although the electrode 92 is formed of a single metal plate in the first embodiment, the electrode 92 is not limited to such a configuration. For example, the electrode 92 may be formed by layering multiple plates in such a manner that the plates are in close contact with each other, or in such a manner that the plates are placed at intervals. FIG. 6 is a diagram that shows a variation example of the electrode. An electrode 192 includes a first electrode plate 192A and a second electrode plate 192B. A material having high heat conductivity, e.g., a heat-conductive sheet 193, is placed between the first electrode plate 192A and a second electrode plate 192B. Multiple electrode plates may be layered in such a way to form an electrode that serves as a partition and a heat-conductive part.

Furthermore, in order to increase a surface area of the electrode 92, the electrode 92 may be embossed or corrugated, and thus, the heat-exchange function of the electrode 92 may be improved. Additionally, plate-like bodies (fins), projections or the like may be formed on the electrode 92 in such a manner that they intersect with the flow of the introduced exhaust atmosphere, so that the exhaust atmosphere collides with these objects. In this way, the process of heat exchange can be facilitated.

Although the electric-field unit 90 is formed by a single casing 91, it is not limited to such a configuration. For example, multiple casings may be combined to form an electric-field unit 90.

The front wall 91A and the rear wall 91B (see FIG. 3) of the casing 91 may be configured to be openable and closable, thereby facilitating maintenance of the condensation part 30 and the dust-collection part 40.

In the first embodiment, the discharge duct 15 is provided in the dust-collection part 40, such that the exhaust atmosphere 22 (22E) including the solvent 23 is led to the discharge duct 15, and is discharged from the dust-collection part 40. However, the disclosure is not limited to such a configuration. For example, instead of providing a discharge duct 15 in the dust-collection part 40, the solvent 23 may be caused to adhere onto the electrode 48 to remove the same.

Although embodiments of the disclosure are described above, the above-described embodiments are merely examples for carrying out the disclosure. Therefore, the disclosure is not limited to the above-described embodiments, and the above-described embodiments can be modified as appropriate without departing from the scope of the disclosure. For example, any of the above various embodiments/variation examples can be combined to realize respective effects brought about by them. Furthermore, combination of embodiments, combination of examples, and combination of embodiments and examples are possible, and also, combination of features in different embodiments and/or examples is possible.

The solvent separation method and the solvent separation apparatus according to the disclosure make it possible to retrieve the thermal energy possessed by the exhaust atmosphere released during the solvent-removal step, thereby suppressing reductions in the temperature of the exhaust atmosphere. Therefore, the solvent separation method and the solvent separation apparatus can be applied to any exhaust gas-generating apparatuses (e.g., drying furnaces, baking furnaces, cure furnaces, and reflow furnaces) that are utilized in processes of production of various industrial products and various electronic components.

What is claimed is:

1. A solvent separation apparatus, comprising:
    a condensation part that a gas including a vaporized solvent is introduced into in a first direction, and in which an electric field is applied to the gas to condense the vaporized solvent, and the gas is discharged therefrom to a downstream side of said condensation part;
    a dust-collection part that the gas discharged from the downstream side of the condensation part is introduced into in a second direction opposite to the first direction, and in which an electric field is applied to the gas to separate the vaporized solvent; and
    a heat-exchange part that is placed between the condensation part and the dust-collection part, and that provides heat exchange between the gas within the condensation part and the gas within the dust-collection part.

2. The solvent separation apparatus according to claim 1, wherein the condensation part has a condensation region that serves as a space into which the gas is introduced, the dust-collection part has a dust-collection region that serves as a space into which the gas discharged from the condensation part is introduced, the condensation region and the dust-collection region are adjacent to each other, and the heat-exchange part is located between the condensation region and the duct-collection region.

3. The solvent separation apparatus according to claim 2, wherein the condensation part and the dust-collection part are included in an electric-field unit, and the electric-field unit further includes a casing that configures the condensation region and the dust-collection region, and the heat-exchange part that separates the condensation region and the dust-collection region.

4. The solvent separation apparatus according to claim 2, wherein the condensation part has a first electrode surface that is exposed to the condensation region and from which the electric field is applied to the gas within the condensation region, the dust-collection part has a second electrode surface that is exposed to the dust-collection region and from which the electric field is applied to the gas within the dust-collection region, and the heat-exchange part includes an electrode having the first electrode surface and the second electrode surface.

5. The solvent separation apparatus according to claim 3, wherein the condensation part has a first electrode surface that is exposed to the condensation region and from which the electric field is applied to the gas within the condensation region, the dust-collection part has a second electrode surface that is exposed to the dust-collection region and from which the electric field is applied to the gas within the dust-collection region, and the heat-exchange part includes an electrode having the first electrode surface and the second electrode surface.

6. The solvent separation apparatus according to claim 4, wherein the electrode has a first surface and a second surface opposite to the first surface, the first surface configures the first electrode surface, and the second surface configures the second electrode surface.

7. The solvent separation apparatus according to claim 5, wherein the electrode has a first surface and a second surface opposite to the first surface, the first surface configures the first electrode surface, and the second surface configures the second electrode surface.

8. The solvent separation apparatus according to claim 1, further comprising a blower that sucks the gas from the condensation part, that changes a direction of flow of the gas, and that delivers the gas to the dust-collection part.

* * * * *